(12) United States Patent
Lin

(10) Patent No.: US 6,409,388 B1
(45) Date of Patent: Jun. 25, 2002

(54) BALL SUPPORT HAVING A CLEANING STRUCTURE

(76) Inventor: Chuan Duo Lin, 7F, No. 46, Pin Ho 10 Street, Chang Hua (TW), 500

( * ) Notice: Subject to any disclaimer, the term of this patent is extended or adjusted under 35 U.S.C. 154(b) by 0 days.

(21) Appl. No.: 09/754,789

(22) Filed: Dec. 29, 2000

(51) Int. Cl.7 .......................... F16C 29/04; B60G 13/00; B60B 33/08
(52) U.S. Cl. ........................ 384/49; 16/29; 193/35 MD
(58) Field of Search ................ 384/49; 16/26; 193/35 MD

(56) References Cited

U.S. PATENT DOCUMENTS

| | | | |
|---|---|---|---|
| 1,582,795 A | * 4/1926 | Smith | 16/26 |
| 3,739,894 A | * 6/1973 | Hinman | 16/26 |
| 4,696,583 A | 9/1987 | Gorges | 384/49 |
| 4,732,490 A | 3/1988 | Masciarelli | 384/49 |
| 4,996,738 A | 3/1991 | Tifre | 16/26 |
| 5,516,211 A | * 5/1996 | Barnes et al. | 384/49 |
| 5,540,314 A | * 7/1996 | Coelln | 193/35 MD |
| 6,279,716 B1 | * 8/2001 | Kayatani et al. | 193/35 MD |

* cited by examiner

Primary Examiner—Thomas R. Hannon

(57) ABSTRACT

A ball support includes a cup having a passage formed through the cup and communicating with the chamber of the cup, and having a peripheral flange for attaching to an object. A rotary member and a number of balls are received and retained in the chamber of the cup. The cup includes an outer cut-off portion communicating with the chamber and the passage of the cup for allowing a cleaning agent to flow into the chamber of the cup. to clean the ball support. The peripheral flange includes a recess communicating with the passage and the cut-off portion of the cup.

7 Claims, 2 Drawing Sheets

BALL SUPPORT HAVING A CLEANING STRUCTURE

BACKGROUND OF THE INVENTION

1. Field of the Invention

The present invention relates to a ball support, and more particularly to a ball support having a cleaning structure for cleaning the ball support.

2. Description of the Prior Art

Various kinds of typical ball supports or ball units have been widely developed and used today. U.S. Pat. No. 4,696,583 to Gorges and U.S. Pat. No. 4,732,490 to Masciarelli disclose two of the typical ball supports and include a large ball and a number of small balls rotatably received in an enclosed housing which are enclosed for retaining the balls therein. U.S. Pat. No. 4,996,738 to Tifre disclose the other typical ball support also having a large ball and a number of small balls rotatably received in a housing. The housing includes an access hole formed therein for receiving a tool which may be used to disengage the large ball from the housing. However, the typical ball supports have no cleaning structure formed therein such that the ball supports may not be suitably cleaned. Dirt or the like may enter into the ball support and may damage the ball support if the ball support may not be suitably cleaned.

The present invention has arisen to mitigate and/or obviate the afore-described disadvantages of the conventional ball supports.

SUMMARY OF THE INVENTION

The primary objective of the present invention is to provide a ball support including a cleaning structure for cleaning the ball support and for maintaining the bearing effect of the ball support.

In accordance with one aspect of the invention, there is provided a ball support comprising a cup including a peripheral portion having a peripheral flange laterally extended outward therefrom, and including a chamber formed therein, and including a passage formed through the cup and communicating with the chamber of the cup, and including an outer peripheral portion having a cut-off portion formed therein and communicating with the passage of the cup, a rotary member received in the chamber of the cup, a plurality of balls received in the chamber of the cup and engaged between the rotary member and the cup, and means for retaining the rotary member and the balls in the cup. The passage and the cut-off portion of the cup are communicating with the chamber of the cup for allowing a cleaning agent to flow into the chamber of the cup to clean the ball support.

The peripheral flange of the cup includes a recess communicating with the passage and the cut-off portion of the cup.

An object includes a cavity formed therein for receiving the cup, and includes a port communicating with the cavity thereof for receiving the cleaning agent and for allowing the cleaning agent to flow into the chamber of the cup via the passage and the cut-off portion of the cup.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
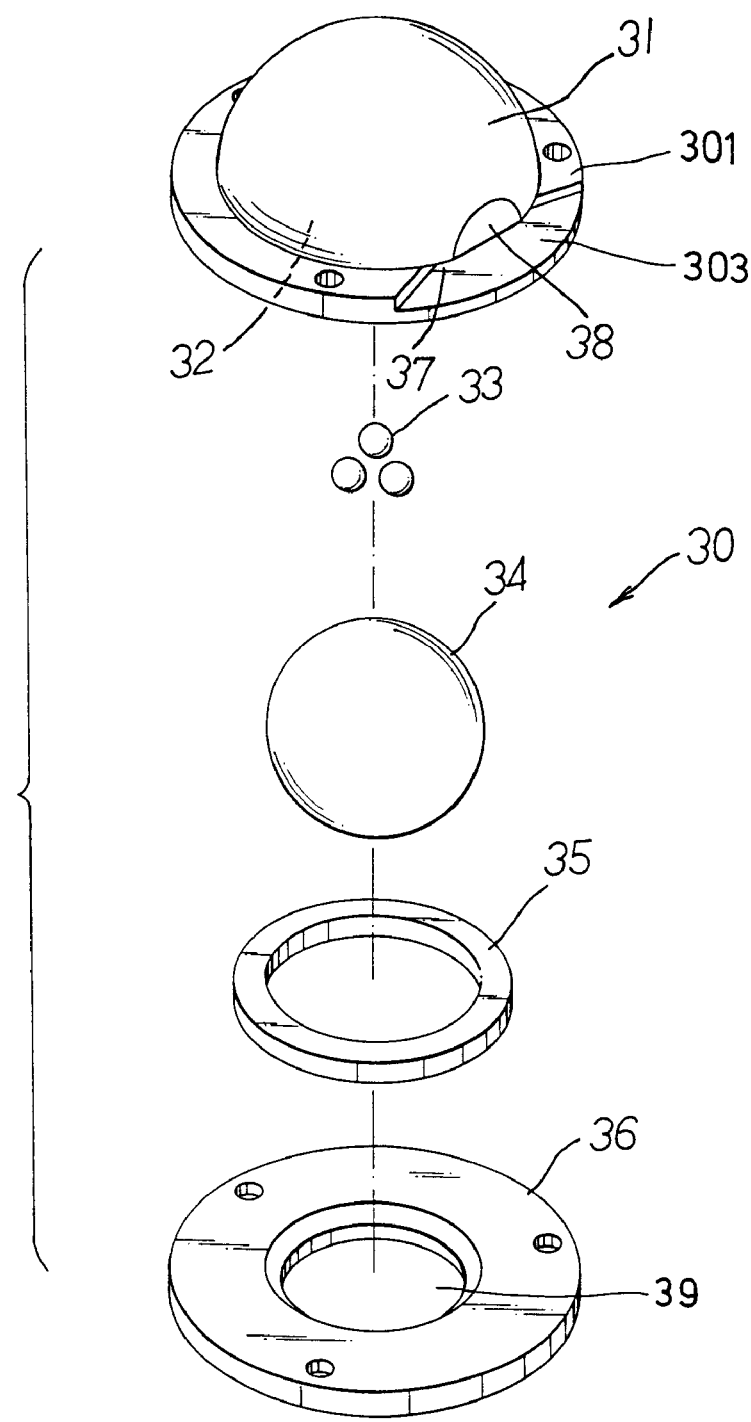
FIG. 1 is an exploded view of a ball support in accordance with the present invention.
Figure 2:
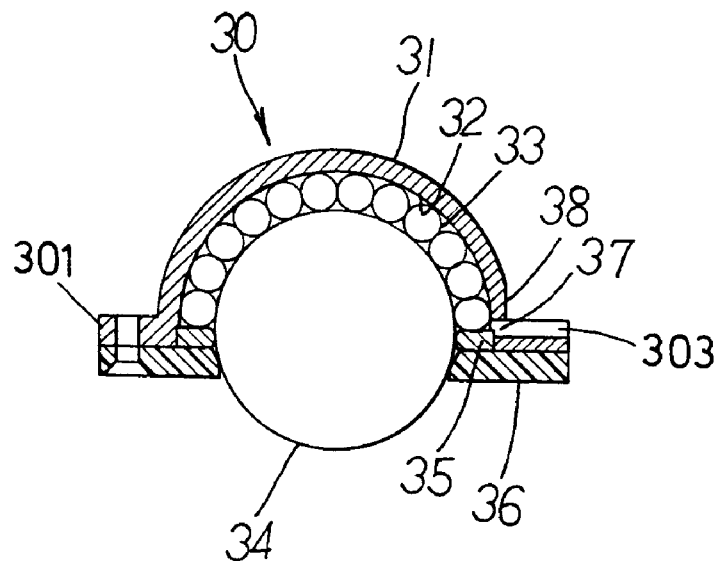
FIG. 2 is a cross sectional view of the ball support.

Referring to the drawings, and initially to FIGS. 1 and 2, a ball support 30 in accordance with the present invention comprises a cup 31 including a substantially semi-spherical shape and including a peripheral flange 301 extended laterally outward from the bottom peripheral portion of the cup 31. A rotary member, such as a cylindrical member or a large ball 34 is rotatably received in the chamber 32 of the cup 31, and a number of small balls 33 are also rotatably received in the chamber 32 of the cup 31 and engaged between the cup 31 and the rotary member 34 for forming a ball bearing structure.

A ring 35 is engaged on the rotary member 34 and engaged with the balls 33. A cover 36 is secured to the cup 31 with fasteners 23 (FIG. 3) and includes an orifice 39 formed therein for receiving the rotary member 34 and arranged for allowing the rotary member 34 to be partially extended outward of the cover 36. The orifice 39 of the cover 36 includes a diameter smaller than that of the rotary member 34 such that the rotary member 34 may be rotatably retained in the cup 31 by the cover 36. The cup 31 and the cover 36 may be received in a cavity 21 of an object 20 (FIG. 3), such as a working machine, a working table or the like, and may be secured to the object 20 with the fasteners 23.

Referring next to FIG. 3 and again to FIG. 2, the peripheral flange 301 of the cup 31 includes a recess 303 formed therein, and the cup 31 includes a passage 37 formed therein and formed through the cup 31 and communicating with or between the chamber 32 of the cup 31 and the recess 303 of the peripheral flange 301 of the cup 31. The cup 31 includes a cut-off portion 38 formed therein and communicating with the passage 37 of the cup 31 and the recess 303 of the peripheral flange 301 of the cup 31, for communicating the chamber 32 and the passage 37 of the cup 31 with the cavity 21 of the object 20. The object 20 includes a port 22 for coupling to a cleaning water or fluid or agent reservoir via a hose 24 or the like.

Figure 3:
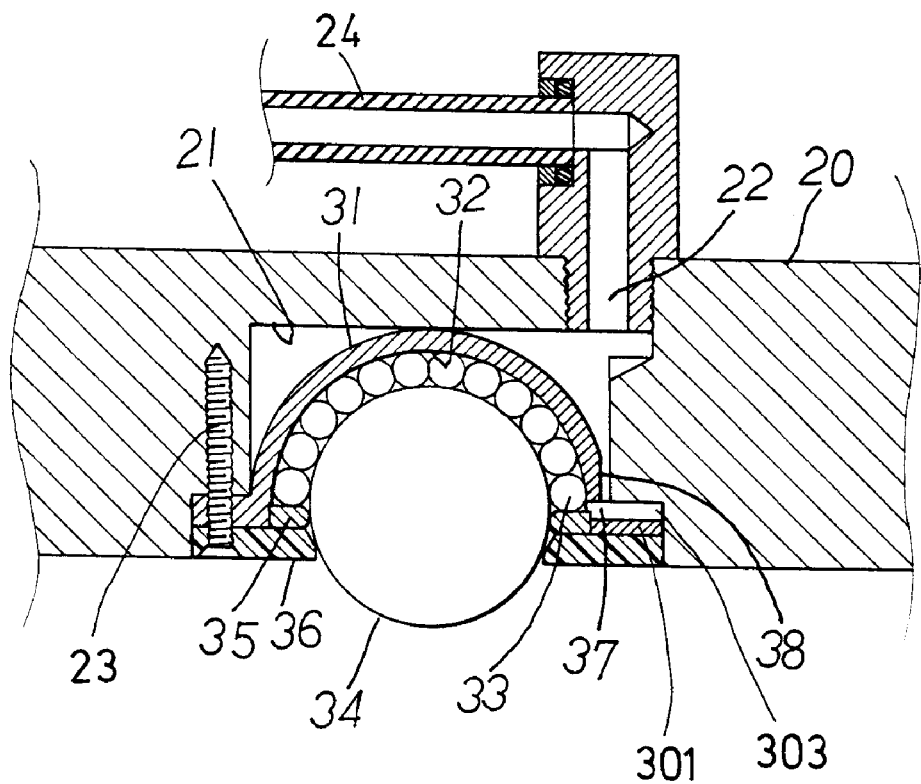
FIG. 3 is a cross sectional view illustrating the attachment of the ball support to an object.

In operation, as shown in FIG. 3, the cleaning water or the cleaning detergent may be supplied into the cavity 21 of the object 20 via the port 22 and may be forced to flow through the cut-off portion 38 and the passage 37 and the chamber 32 of the cup 31 and may thus be used to cleaning the interior of the ball support. The cleaning water or detergent may flow out through the orifice 39 of the cover 36. After the ball support is cleaned, the oil or grease may also be filled into the ball support via the port 22 and the cavity 21 of the object 20 and the cut-off portion 38 and the passage 37 and the chamber 32 of the cup 31 for lubricating the ball support.

Accordingly, the ball support in accordance with the present invention includes a cleaning structure for cleaning the ball support and for facilitating or maintaining the bearing effect of the ball support.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ball support comprising:

a cup including a peripheral portion having a peripheral flange laterally extended outward therefrom, and including a chamber formed therein, and including a passage formed through said cup and communicating with said chamber of said cup, and including an outer peripheral portion having a cut-off portion formed therein and communicating with said passage of said cup, a rotary member received in said chamber of said cup, a plurality of balls received in said chamber of said cup and engaged between said rotary member and said cup, and means for retaining said rotary member and said balls in said cup, said passage and said cut-off portion of said cup being communicating with said chamber of said cup for allowing a cleaning agent to flow into said chamber of said cup to clean said ball support.

2. The ball support according to claim 1, wherein said peripheral flange of said cup includes a recess formed therein and communicating with said passage and said cut-off portion of said cup.

3. The ball support according to claim 1 further comprising an object including a cavity formed therein, said cup being received in said cavity of said object, and means for securing said cup to said object.

4. The ball support according to claim 3, wherein said object includes a port communicating with said cavity thereof for receiving the cleaning agent and for allowing the cleaning agent to flow into said chamber of said cup via said passage and said cut-off portion of said cup.

5. A ball support comprising:

an object including a cavity formed therein and including a port communicating with said cavity thereof for receiving a cleaning agent, a cup secured in said cavity of said object and including a peripheral portion having a peripheral flange laterally extended outward therefrom, and including a chamber formed therein, and including a passage formed through said cup and communicating with said chamber of said cup and communicating with said cavity of said object for allowing the cleaning agent to flow into said chamber of said cup via said passage of said cup, a rotary member received in said chamber of said cup, a plurality of balls received in said chamber of said cup and engaged between said rotary member and said cup, and means for retaining said rotary member and said balls in said cup, said passage and said chamber of said cup being communicating with said cavity and said port of said object for allowing the cleaning agent to flow into said chamber of said cup to clean said ball support.

6. The ball support according to claim 5, wherein said cup includes an outer peripheral portion having a cut-off portion formed therein and communicating with said passage of said cup and communicating with said cavity of said object.

7. The ball support according to claim 6, wherein said peripheral flange of said cup includes a recess formed therein and communicating with said passage and said cut-off portion of said cup.

* * * * *